Feb. 3, 1970  R. P. CRANDALL ET AL  3,493,193

STRIP HANDLING SYSTEM

Filed May 20, 1968

ROBERT P. CRANDALL
RONALD A. PHILLIPS
INVENTORS

BY  R. Lewis Gable

Robert W. Hampton
ATTORNEYS

United States Patent Office
3,493,193
Patented Feb. 3, 1970

3,493,193
STRIP HANDLING SYSTEM
Robert P. Crandall and Ronald A. Phillips, Rochester, N.Y., assignors to Eastman Kodak Company, Rochester, N.Y., a company of New Jersey
Filed May 20, 1968, Ser. No. 730,252
Int. Cl. G03b 1/04
U.S. Cl. 242—203            9 Claims

ABSTRACT OF THE DISCLOSURE

This disclosure relates to a strip handling system for withdrawing and returning a strip from a magazine having a core upon which the strip may be wound. The strip handling system includes in one illustrative embodiment a reversible motor for driving both the core of the magazine and a capstan associated with the strip. More specifically, the reversible motor drives the capstan in an advance or unwinding direction through a one-way clutch that only transmits a rotational torque to the capstan in the advance direction. The reversible motor is also coupled to the core of the magazine through a one-way clutch that only transmits a rotational torque to the core of the magazine in a rewinding direction. In order to prevent the strip from being unwound after the motor has been stopped abruptly, a brake is applied to the core through a one-way clutch that only applies braking torque to the core when the core is being pulled by the film in the advance direction. In addition, the application of the braking torque is delayed by a predetermined amount thereby allowing the capstan to withdraw easily the leading end of the strip from the magazine. The speed of the strip is determined by the tangential velocity of the capstan; therefore, a suitable slip clutch is disposed between the reversible motor and the core of the magazine in order to allow the core in rewind to rotate at a speed controlled by the linear velocity of the strip and the tangential velocity of the capstan.

Cross-references to related applications

Reference is made to commonly assigned copending U.S. patent application Ser. No. 730,431, entitled "Magazine Interlock Mechanism," filed May 20, 1968, in the names of R. P. Crandall and R. A. Phillips.

BACKGROUND OF THE INVENTION

Field of the invention

This invention relates to a strip handling system and more particularly to a system for controlling and directing the winding and unwinding movement of a strip into and from a supply thereof.

The strip handling system of the present invention is particularly adapted for use with apparatus in which a strip of photographic film is selectively wound or unwound from a supply. In one particular embodiment, this invention is described with regard to a magazine having a core upon which the strip of film is subsequently wound and unwound. Though this invention is illustratively described as being used in photographic apparatus, it is understood that the system of the present invention could be used with equal facility and advantage in other strip handling systems, and therefore the following description is provided for illustrative purposes only.

Description of the prior art

One problem encountered in the handling of flexible strips is that of damage to the strip caused by the rewinding of the strip into the supply (i.e., magazine) at a rate which is faster than the independently driven supply can take up the strip. This results in the strip buckling and/or jamming in the associated driving mechanism. A second problem associated with strip handling apparatus is caused by the varying linear velocity of the strip as it is wound onto or from its supply. More specifically, as a greater length of the strip is wound onto the magazine, the effective radius about the core of the magazine and therefore the linear velocity of the tape is increased. In many strip handling systems, where a capstan is used to drive the strip at a substantially constant, linear velocity, it is necessary to provide some compensation for the varying tangential velocity of the core of the magazine.

In U.S. Patent No. 3,246,857, by John E. Morse, entitled "Strip Handling Device," and assigned to the assignee of this invention, there is disclosed a strip handling device including a first motor for applyng a substantially constant rewind torque to the core of a magazine, and a second reversible motor for driving a capstan in either a rewinding or unwinding direction. The motors are chosen so that the first motor associated with the magazine is capable of rewinding the magazine at a greater tangential velocity than that at which the second motor is capable of rotating the capstan in a rewinding direction. The second motor is connected to the capstan through a clutch capable of transmitting torque to the capstan in an advance or unwinding direction, but is only capable of transmitting torque to the capstan in a rewinding direction when there is a load placed on the capstan tending to rotate the capstan at a rate faster than that of the second motor. It is pointed out that the operation of the above-identified patent is described with regard to two motors, one capable of being driven in either direction and the second motor connected to the magazine for applying a torque to the core of the magazine in a rewinding direction.

SUMMARY OF THE INVENTION

It is therefore an object of this invention to provide a new and improved strip handling system wherein a single motor is used to drive the core of the magazine and also to drive the capstan associated with the strip.

It is a further object of the present invention to provide a new and improved strip handling system wherein excessive unwinding of the strip from the core of the magazine is prevented when the motor is suddenly stopped.

It is a still further object of this invention to provide a new and improved strip handling system wherein the differences in the tangential velocities of the capstan and the winding of the strip upon the core of the magazine are compensated.

These and other objects are accomplished in accordance with the teachings of this invention by providing a strip handling system including a dual functioning motor for first driving a capstan and secondly for driving the core of a magazine upon which a strip is wound and unwound. The motor is coupled to the capstan through a first clutch capable of only providing a rotational torque to the capstan in the advance or unwinding direction. The motor is also connected to the core of the magazine through a second clutch capable of only providing a rotational torque to the core in the winding or reverse direction. In order to prevent excessive unwinding of the strip from the magazine when the motor is suddenly stopped, a braking torque is applied to the core of the magazine through a third or brake clutch capable of only applying the braking torque to the core when the strip is moving in an advance direction. In order to allow the capstan and a pressure roller to easily engage and withdraw the strip from the magazine, the application of the braking torque is delayed after each reversal for a suitable period, such as a half a revolution of the core. The motor is connected to the core through the aforementioned second clutch and a slip clutch which compensates for differing tangential velocities applied to the strip by the capstan and the core.

BRIEF DESCRIPTION OF THE DRAWINGS

These and other objects and features of the present invention will become more apparent when considered in view of the following description and drawings in which.

DESCRIPTION OF THE PREFERRED EMBODIMENT

Figure 1:
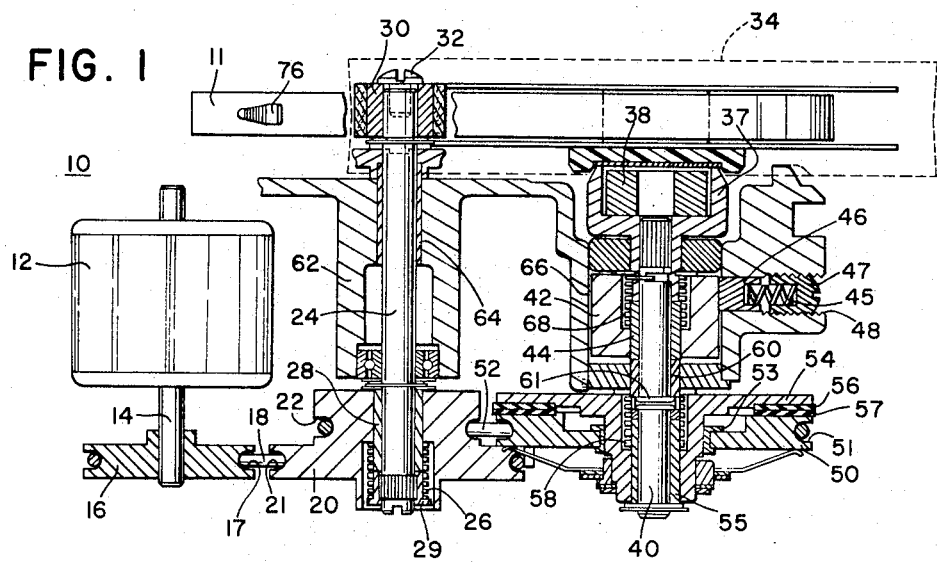
FIG. 1 is a sectioned view of a strip handling system in accordance with the teachings of the present invention.

With reference to the drawings and in particular to FIG. 1, there is shown a strip handling system 10 for transporting a strip 11, for example, microfilm, from a supply such as a magazine 34 through a further device (not shown) in which the film is moved for scanning, viewing, exposing, printing, processing or for any other purpose. The magazine 34 contains a reel 35 (FIG. 2) upon which the strip 11 is wound about a core 36. A suitable reversible motor 12 is energized from a power source (not shown) to apply a rotational torque to a drive shaft 14, which in turn is fixedly secured to a drive pulley 16. A belt 18 is disposed in a belt run 17 of the drive pulley 16 and serves to transfer a rotational torque from the pulley 16 to a capstan pulley 20. As shown in FIG. 1, the capstan pulley 20 has a belt run 21 in which the pulley belt 18 is placed, and a second belt run 22 of a smaller diameter than the belt run 21. In turn, a belt 52 is disposed in the belt run 22 and serves to transfer rotational torque from the capstan pulley 20 to a take-up pulley 50. In particular, the belt 52 is disposed within a belt run 51 about the periphery of the take-up pulley 50.

Figure 2:
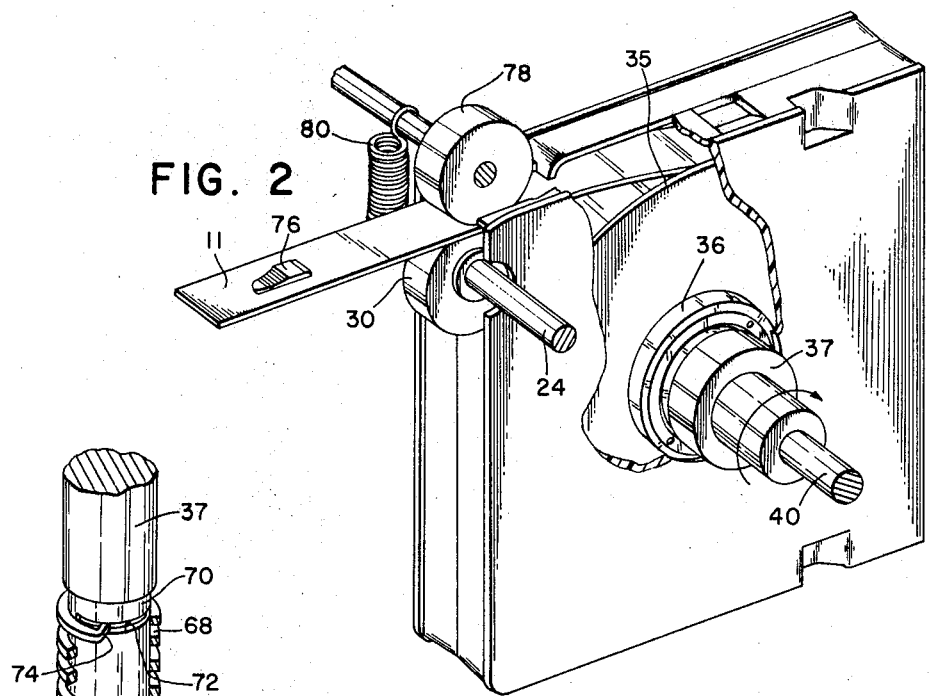
FIG. 2 is an orthogonal view of the associated magazine and the manner in which it may be driven by the strip handling system shown in FIG. 1.

As shown in FIGS. 1 and 2, the capstan pulley 20 is connected through a capstan drive shaft 24 to a capstan roller 30. The capstan roller 30 is secured to the shaft 24 by a left-handed screw 32. This screw 32 serves to retain the capstan roller 30 and will not loosen since as will be explained in greater detail later torque can be presented to the capstan drive shaft 24 in only one direction due to a one-way clutch 26. The left-handed screw 32 permits easy service replacement of the capstan roller 30. The motor 12 and the capstan drive shaft 24 may be supported by a housing 62; more specifically, the capstan drive shaft 24 is disposed within an opening 64 of the support housing 62. The capstan pulley 20 is connected to a bearing 28 in a fixed relationship. As shown in FIG. 1, the bearing 28 is disposed and rotates about the capstan drive shaft 24, and is coupled by the one-way clutch 26 to a sleeve 29, which is connected to the shaft 24 in a fixed relationship. Illustratively, the one-way clutch 26 could take the form as shown in FIG. 1 of a helical spring having a square cross section. As its name implies, the clutch 26 serves to only couple a rotational torque from the pulley 20 to the capstan drive shaft 24 in a forward or strip unwinding direction. With regard to FIG. 2, the clutch 26 would serve to impart a rotational motion in a counterclockwise direction to drive the capstan roller 30. More specifically, the clutch 26 operates to transfer a rotational torque from the pulley 20 to the drive shaft 24 when the pulley 20 is rotating at an angular velocity in excess of the angular velocity of the drive shaft 24 in a forward or strip unwinding direction. In the illustrative embodiment as shown in FIG. 1, where the clutch 26 takes the form of a helical spring, the rotation of the pulley 20 in a forward direction tends to contract or tighten the helical spring about the bearing 28 to thereby transmit rotational torque from the pulley 20 to the shaft 24.

Rotational torque is transferred from the capstan pulley 20 to the take-up pulley 50 by the belt 52 which is disposed within the belt run 51 of the pulley 50. As shown in FIG. 1, the take-up pulley 50 is rotatably mounted within a bearing 53, which is in turn rotatably mounted with respect to a clutch disk 54. The rotational torque is transferred to the clutch disk 54 through a friction clutch comprising clutch pads 56 and 57, respectively connected to the pulley 50 and the disk 54. The clutch disk 54 is in turn connected in a fixed relationship to a bearing 55, which is rotatably disposed about a take-up shaft 40. The take-up shaft 40 is rotatably mounted within an opening 66 of the support housing 62. The rotational torque applied through the pulley 50, the clutch pads 56 and 57, and the bearing 55 is coupled by a one-way clutch 58 to the take-up shaft 40. In the illustrative embodiment of FIG. 1, the clutch 58 takes the form of a helical spring having a square cross section. The one-way clutch 58 is disposed about the bearing 55 and a sleeve 60, which is connected in a fixed relationship to the take-up shaft 40 by a pin 61 disposed through the sleeve 60 and the shaft 40. The one-way clutch 58 operates to only transmit a rotational torque to the take-up shaft 40 in a backward or rewind direction.

As shown in FIGS. 1 and 2, the take-up shaft 40 is connected in a fixed relation with a magnetic chuck 38, which is in turn coupled to the core 36 of the magazine 34. As described in the above-identified copending application, the magazine 34 may be inserted and withdrawn from the film reader in which a strip handling system 10 of this invention may be incorporated. More specifically, the core 36 may be coupled and disengaged from the magnetic chuck 38. The strip 11 which is wound upon the core 36 of the magazine 34 may be withdrawn by the capstan roller 30 working in cooperation with a pressure roller 78. More specifically, a rotational torque in a forward or unwinding direction is imparted to the capstan roller 30 and a suitable tension is provided by a spring 80 connected to the roller 78 to direct the pressure roller 78 against the strip 11. As explained in the above-identified copending application, the roller 78 may be withdrawn to allow the insertion of the strip 11 between the pressure roller 78 and the capstan roller 30. A leader button or stop 76 is provided to actuate a detent mechanism for preventing the withdrawal of the magazine 34 while a portion of the strip 11 is unwound from the magazine 34. In order to rewind the strip 11 into the magazine 34, a clockwise torque (as shown in FIG. 2) is imparted through the shaft 40 and the chuck 38 to the core 36.

In order to prevent excessive unwinding of the strip 11 from the core 36 when the rotational torque for withdrawing the strip 11 from the magazine 34 is suddenly disconnected, a braking or counter torque is applied to the shaft 40 through a brake hub 42. As shown in FIG. 1, the brake 42 is connected in a fixed relation to a hub bearing 44, which is in turn rotatably mounted about the take-up shaft 40. A drag 46 is disposed within an opening 48 of the support housing 62 and is biased by a spring 45 against the brake hub 42 in a frictional relationship to thereby impart a retarding or braking action upon the shaft 40. The spring 45 is adjustably held in tension against the drag 46 by a screw 47 threadably received within the opening 48.

It is not desired to apply the braking torque to the take-up shaft 40 and the magnetic chuck 38 when the shaft 40 is being rotated in a rewinding or backward direction. In order to only apply the braking torque to the shaft 40 when the shaft 40 is being driven in a forward or unwinding direction, a one-way brake clutch 68 is provided between the hub bearing 44 and the take-up shaft 40. As illustratively shown in FIG. 1, the one-way clutch 68 takes the form of a helical spring having a square cross section. The brake clutch 68 is disposed about and engages the hub bearing 44 and a chuck support 37, which is connected in a fixed relation with the take-up shaft 40. Thus, when the shaft 40 is rotated in a strip unwinding direction, the spring 68 will tend to tighten about the bearing 44 and the chuck support 37 to thereby couple a braking torque from the drag 46 to the magnetic chuck 38.

Figure 3:
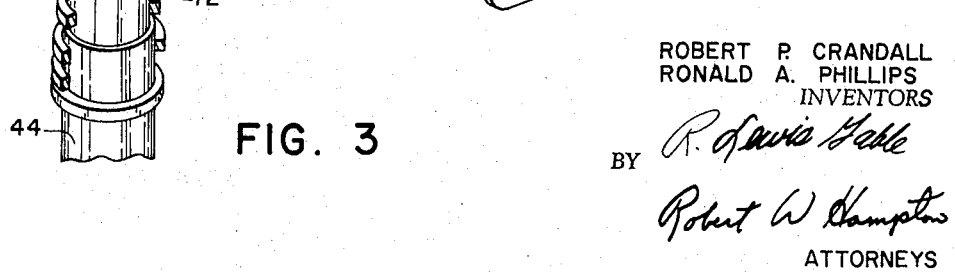
FIG. 3 is an enlarged, detailed view of the mechanism associated with the take-up shaft of the system of FIG. 1 for delaying the application of the braking torque.

As described above with regard to FIG. 2, the magazine 34 is disposed within a reader or device such as a viewer, and the magnetic chuck 38 is brought into engagement with the core 36. Further, the leading end of the strip 11 is disposed between the pressure roller 78 and the capstan roller 30. An appropriate rotational torque is applied through the capstan drive shaft 24 to the capstan roller 30 to pay out the strip 11 from the magazine 34. As the strip 11 is being unwound, the stop 76 will be brought into engagement with the pressure roller 78. An additional rotational torque will be needed to drive the stop 76 between the pressure roller 78 and the capstan roller 30. It may be understood that if either the surface of the strip 11 or the surfaces of the rollers 30 and 78 are unduly smooth, there may be difficulty in driving the stop 76 through the rollers 30 and 78. The additional retarding torque applied by the drag 46 through the take-up shaft 40 to the core 36 may be sufficient to prevent the stop 76 from being driven through the rollers 30 and 78. Therefore, it is desirable to delay the application of the retarding or braking torque to the take-up shaft 40 until after the stop 76 has been driven through the rollers 30 and 78. In particular, the one-way clutch 68 is prevented from coupling the chuck support 37 to the hub bearing 44 when driven in a forward or unwinding direction for approximately one half of a revolution of the take-up shaft 40, i.e., the distance required to drive the stop 76 through the rollers 30 and 78. In an illustrative embodiment shown in detail in FIG. 3, the one-way clutch 68 takes the form of a helical spring having a hook 74 at one end, which hook 74 is disposed within a slot 72. The slot 72 is formed within the chuck support 37. Further, a portion of the chuck support 37 has a surface 70 of reduced diameter to prevent the clutch 68 from frictionally engaging the chuck support 37 before the hook 74 has been rotated through and has engaged one end of the slot 72. After the take-up shaft 40 and the chuck support 37 have been rotated through approximately one-half turn, the hook 74 will engage the end of the slot 72 thereby extending and constricting the clutch 68 until it grabs the surface 70 of the chuck support 37 and the hub bearing 44 to thereby transmit the braking torque from the drag 46 to the magnetic chuck 38.

Operation of the preferred embodiment

As explained above with regard to FIG. 2, the magazine 34 is disposed within a device such as a microfilm reader so that the core 36 is coupled to the magnetic chuck 38 and that the leading end of the strip 11 is disposed between the capstan roller 30 and the pressure roller 78. The drive in advance is transmitted from the motor 12 by the belt 18 from the drive pulley 16 to the capstan pulley 20. In turn the rotational torque in advance is transmitted through the one-way clutch 26, which locks in a forward or unwinding direction, to the capstan drive shaft 24 and the capstan roller 30. As shown in FIG. 2, the rotational torque applied to the capstan roller 30 serves to unwind the strip 11 thereby rotating the core 36, the magnetic chuck 38 and the shaft 40. With regard to FIGS. 1 and 3, a braking torque is applied to the magnetic chuck 38 after the magnetic chuck 38 and the chuck support 37 have been rotated through one-half turn or the distance required to feed the stop 76 through the rollers 30 and 78. After one-half turn of the chuck support 37 in advance, the hook 74 of the clutch 68 engages in the slot 72 thereby causing the one-way clutch 68 to transmit the braking torque applied by the drag 46 to the magnetic chuck 38. The take-up shaft 40 is coupled through the one-way clutch 58 to the take-up pulley 50, which is in turn connected by the belt 52 to the capstan pulley 20. Though the pulley 50 is driven in advance, the take-up shaft 40 is allowed to run in the advance or unwinding direction at the speed determined by the withdrawal of the strip 11 by the one-way clutch 58 which overruns in advance.

The motor 12 is reversible and serves to drive the capstan pulley 20 and the take-up pulley 50 in reverse. The take-up pulley 50 transmits a rewinding torque to the take-up shaft 40 and the magnetic chuck 38 through the one-way clutch 58, which locks in the reverse or rewinding direction. The take-up shaft 40 does not drive the brake hub 42 in the rewind direction as the one-way clutch 68 overruns in the rewind or reverse direction. The rotational torque applied to the take-up shaft 40 and the chuck 38 serves to rewind the strip 11 about the core 36 of the magazine 34. The strip 11 can be rewound no faster than the capstan roller 30 will allow, because the one-way clutch 26 connecting the capstan roller 30 to the capstan pulley 20 will lock when the speed of the capstan drive shaft 24 equals the speed at which the capstan pulley 20 is being driven by the motor 12. The speed of the take-up pulley 50 is dictated by the speed of the motor 12 and will try to impart to the strip 11 a higher linear speed than the capstan roller 30. The slippage between the clutch pads 56 and 57 allow the take-up pulley 50 to rotate at this higher speed as determined by the motor 12, while the magnetic chuck 38 and the core 36 rotate at the slower speed determined by the motor 12 through the capstan roller 30. In actual practice, the one-way clutch 26 would not normally unlock unless a bind occurred in the magazine 34 during rewind.

This invention has been described in detail with reference to the preferred embodiment, but it will be understood that variations and modifications can be effected within the spirit and scope of the invention as described hereinabove and as defined in the appended claims.

We claim:
1. Apparatus for unwinding and rewinding a flexible strip from and to a supply roll of the flexible strip comprising:
    bidirectional motor means for developing torque in a first, strip rewinding direction and in a second, strip unwinding direction;
    strip drive means associated with the flexible strip;
    first clutch means for coupling said bidirectional motor means to said strip drive means to selectively apply the torque only in said second, strip unwinding direction to said strip drive means; and
    second clutch means for coupling said bidirectional motor means to the supply roll to selectively apply the torque only in said first, strip rewinding direction to the supply roll.

2. Apparatus as claimed in claim 1 further including braking means, and brake clutch means for selectively applying retarding torque provided by the braking means to said supply roll only when the supply roll is being driven in said second, strip unwinding direction.

3. Apparatus as claimed in claim 2 wherein said brake clutch means includes means for delaying the application of the retarding torque to the supply roll for a predetermined time.

4. Apparatus as claimed in claim 1 wherein there is further included overriding clutch means disposed between said bidirectional motor means and the supply roll for allowing the supply roll to rotate at an angular velocity different than the angular velocity of the rotational torque derived from said bidirectional motor means.

5. Apparatus as claimed in claim 4, wherein said overriding clutch means takes the form of a slip clutch.

6. Apparatus as claimed in claim 1, adapted for use with a strip having stop means, said apparatus further including braking means for developing a retarding torque, and brake clutch means for selectively applying said retarding torque to the supply roll only when the supply roll is driven in said second, strip unwinding direction, said brake clutch means including means for delaying the application of said retarding torque to the supply roll until said strip drive means has driven the stop means past said strip drive means.

7. Apparatus as claimed in claim 6, wherein said brake clutch means takes the form of a helical spring having an engaging end, and the supply roll has a shaft associated therewith, said shaft having a slot therein into which said engaging end is disposed.

8. Apparatus for unwinding and rewinding a flexible strip from and to a supply roll of the flexible strip comprising:

bidirectional motor means for developing torque in a first, strip rewinding direction and in a second, strip unwinding direction;

strip drive means to which said torque is applied for driving the flexible strip;

first clutch means for selectively applying said torque to said strip drive means only in said second, strip unwinding direction;

second clutch means for selectively applying said torque to the supply roll only in said first, strip rewinding direction;

braking means for developing a retarding torque; and brake clutch means for selectively applying said retarding torque to the supply roll when the supply roll is being driven in said second, strip unwinding direction.

9. Apparatus as claimed in claim 8 adapted for use with a flexible strip having stop means, wherein said brake clutch means includes means for delaying the application of said retarding torque until the stop means is driven past said strip driving means.

References Cited

UNITED STATES PATENTS

| | | | |
|---|---|---|---|
| 3,220,659 | 11/1965 | Pastor et al. | 242—55.13 |
| 3,246,857 | 4/1966 | Morse | 242—55.12 |
| 3,386,675 | 6/1968 | Thomsen | 242—55.13 |

LEONARD D. CHRISTIAN, Primary Examiner

U.S. Cl. X.R.

226—187; 352—158